(No Model.)

T. B. FAGAN.
TILE DITCHING MACHINE.

No. 275,372. Patented Apr. 10, 1883.

Attest:
F. H. Schott
A. R. Brown

Inventor:
Thomas B. Fagan
 pr C. H. Watson & Co

UNITED STATES PATENT OFFICE.

THOMAS B. FAGAN, OF VAN WERT, OHIO, ASSIGNOR OF ONE-HALF TO WILLIAM SMITH, OF SAME PLACE.

TILE DITCHING MACHINE.

SPECIFICATION forming part of Letters Patent No. 275,372, dated April 10, 1883.

Application filed January 8, 1883. (No model.)

*To all whom it may concern:*

Be it known that I, THOMAS B. FAGAN, a citizen of the United States, residing at Van Wert, in the county of Van Wert and State of Ohio, have invented certain new and useful Improvements in Tile Ditching Machines; and I do hereby declare the following to be a full, clear, and exact description of the invention, such as will enable others skilled in the art to which it appertains to make and use the same.

This invention relates to tile ditching machines; and it consists in the construction and arrangement of parts, as hereinafter more fully described and claimed.

Figure 1:
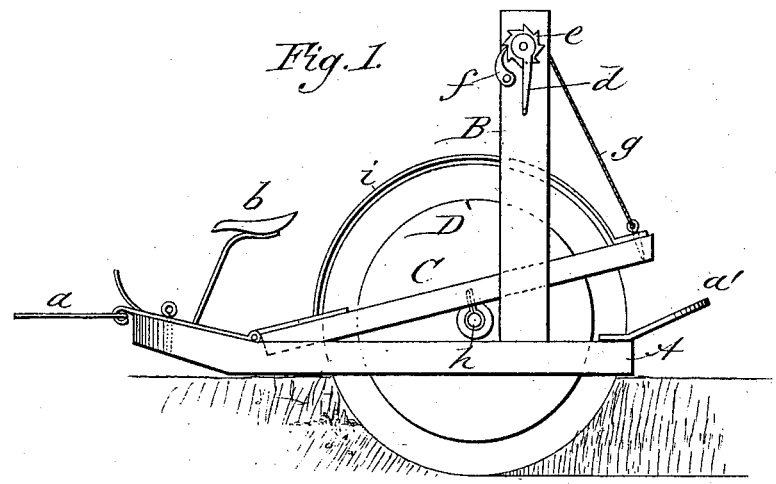
Figure 2:
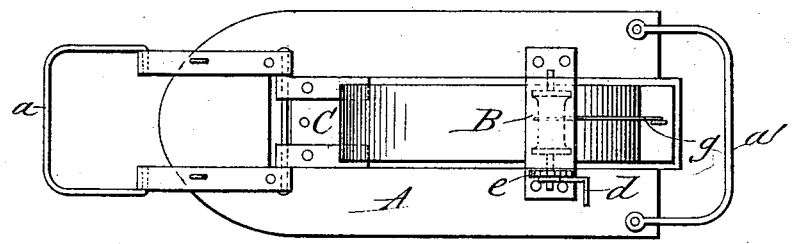
Figure 3:
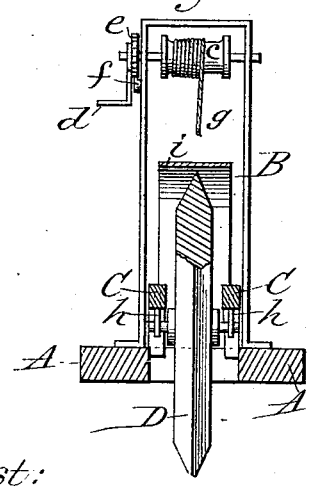
Figure 4:
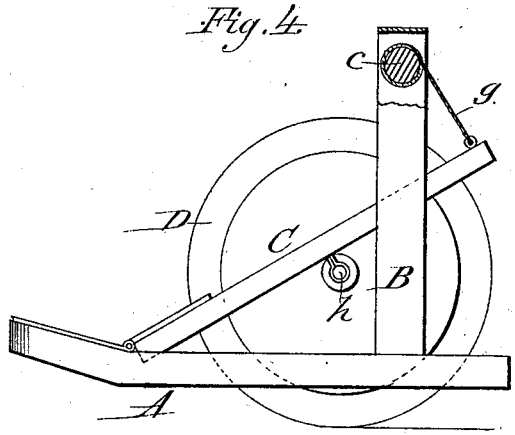

In the annexed drawings, illustrating the invention, Figure 1 is a side elevation of my improved ditching-machine. Fig. 2 is a plan view. Fig. 3 is a sectional end elevation. Fig. 4 is a sectional side elevation.

Like letters designate like parts.

A is a slotted or bifurcated frame, which I term a "mud-boat." This frame is provided at both ends with draft attachments $a$ $a'$, that may have either a pivotal or a rigid connection to the frame. The boat or frame A is also provided with a seat, $b$, for the driver.

Attached to the frame A is a bifurcated standard, B, in the upper end of which is journaled a pulley, $c$, the shaft of which is provided with a crank, $d$, and a ratchet, $e$, a pawl, $f$, being attached to the outer side of the standard. The pulley $c$ is connected by a rope or chain, $g$, to the end of a slotted frame or hanger, C, one end of which is hinged or pivoted to the mud-boat A, so that by simply turning the crank $d$ the frame or hanger C may be adjusted to any desired inclination, where it is held by the pawl and ratchet. The frame C is provided with bearings $h$ for the journals or axle of the cutting and pressing wheel D, the periphery of which is beveled to a cutting-edge, as shown in Fig. 3. A band or guard, $i$, is attached to the frame C above the wheel D to prevent mud or soil from being thrown by the wheel.

It will be seen that the wheel D can be set or adjusted, by means of the crank $d$, so as to produce any depth of cut desired. The ditch is formed by drawing the machine back and forth until the desired depth is attained, the wheel D cutting a furrow having a V-shaped bottom, and pressing the sides of said furrow compactly, so that the tile placed therein will readily remain in the desired position for forming a proper drain. The wheel D, being journaled in a yielding frame, will not be subjected to injury in coming in contact with hard obstructions. The tile used for making the drain may be made of a shape conforming to that of the ditch; or, if desired, some other material—such as brick, stone, or lumber—may be used to advantage.

I am aware that ditching-plows and analogous machines have heretofore been provided with bifurcated frames, and with adjustable pressing-wheels or similar devices; but these I do not broadly claim.

Having thus described my invention, what I claim as new, and desire to secure by Letters Patent, is—

1. In a ditching-machine, the combination of a bifurcated frame or mud-boat, an adjustable frame pivoted thereto, and a cutting and pressing wheel journaled in the adjustable frame, substantially as shown and described.

2. In a ditching-machine, the combination of the mud-boat A, having standard B, the adjustable slotted frame C, the cutting and pressing wheel D, and the pulley $c$ and rope or chain $g$, substantially as shown and described.

In testimony whereof I affix my signature in presence of two witnesses.

THOMAS B. FAGAN.

Witnesses:
A. T. DAILEY,
A. J. PORTER.